United States Patent
Takahashi et al.

(10) Patent No.: US 11,199,610 B2
(45) Date of Patent: Dec. 14, 2021

(54) ONBOARD SENSOR COVER

(71) Applicant: TOYODA GOSEI CO., LTD., Kiyosu (JP)

(72) Inventors: Kazuhisa Takahashi, Kiyosu (JP); Masashi Otoyo, Kiyosu (JP); Akihiro Misawa, Kiyosu (JP); Hitoshi Uchida, Kiyosu (JP); Yasushi Nimi, Kiyosu (JP); Shintaro Okawa, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 235 days.

(21) Appl. No.: 16/654,486

(22) Filed: Oct. 16, 2019

(65) Prior Publication Data

US 2020/0124701 A1 Apr. 23, 2020

(30) Foreign Application Priority Data

Oct. 22, 2018 (JP) .............................. JP2018-198286

(51) Int. Cl.
*G01S 7/03* (2006.01)
*G01S 13/86* (2006.01)
(Continued)

(52) U.S. Cl.
CPC .............. *G01S 7/03* (2013.01); *G01S 13/865* (2013.01); *G01S 7/027* (2021.05); *G01S 13/931* (2013.01); *H01Q 1/42* (2013.01)

(58) Field of Classification Search
CPC ...... G01S 13/931; G01S 13/86; G01S 13/865; G01S 13/867; G01S 2013/93275; H01Q 1/42; H01Q 1/422
See application file for complete search history.

(56) References Cited

U.S. PATENT DOCUMENTS 4,797,683 A * 1/1989 Kosowsky ............... H01Q 1/42
343/705
5,200,851 A * 4/1993 Coderre ................ G02B 5/124
252/587

(Continued)

FOREIGN PATENT DOCUMENTS

DE 10 2011 115 829 A1 4/2013
DE 10 2013 007 378 A1 3/2014
(Continued)

OTHER PUBLICATIONS

Extended European Search Report dated Feb. 19, 2020 in the corresponding EP application No. 19203133.4.
(Continued)

*Primary Examiner* — Peter M Bythrow
(74) *Attorney, Agent, or Firm* — Posz Law Group, PLC

(57) ABSTRACT

An onboard sensor cover includes a cover body that includes front and rear bases and a decorative layer. The front base is made of a transparent plastic material that permits passage of an infrared ray and a millimeter wave and includes a rear surface in the transmission directions of the infrared ray and the millimeter wave that is configured by a first uneven surface. The rear base is made of a plastic material that permits passage of the infrared ray and the millimeter wave and includes a front surface in the transmission directions that is configured by a second uneven surface. The decorative layer is made of a material that reflects visible light and permits passage of the infrared ray and the millimeter wave and is in contact with the first and second uneven surfaces. The front and rear bases are made of the same type of plastic material.

9 Claims, 5 Drawing Sheets

(51) Int. Cl.
*G01S 7/02* (2006.01)
*G01S 13/931* (2020.01)
*H01Q 1/42* (2006.01)

(56) References Cited

U.S. PATENT DOCUMENTS

| | | | | |
|---|---|---|---|---|
| 6,961,023 | B2* | 11/2005 | Fujii | H01Q 1/3258 |
| | | | | 343/713 |
| 7,508,353 | B2* | 3/2009 | Shingyoji | H01Q 1/3233 |
| | | | | 343/909 |
| 8,248,691 | B2* | 8/2012 | Wei | G02B 5/128 |
| | | | | 359/350 |
| 8,974,712 | B2* | 3/2015 | Ohtake | G01S 7/03 |
| | | | | 264/255 |
| 10,431,884 | B2* | 10/2019 | Takahashi | C23C 14/34 |
| 2002/0041968 | A1* | 4/2002 | Sada | B32B 7/02 |
| | | | | 428/432 |
| 2004/0125023 | A1* | 7/2004 | Fujii | H01Q 1/3291 |
| | | | | 343/700 MS |
| 2005/0062660 | A1* | 3/2005 | Henderson | H01Q 1/3233 |
| | | | | 343/754 |
| 2005/0168374 | A1* | 8/2005 | Kamiya | H01Q 1/3233 |
| | | | | 342/1 |
| 2005/0237261 | A1* | 10/2005 | Fujii | H01Q 1/40 |
| | | | | 343/872 |
| 2007/0109206 | A1* | 5/2007 | Fujii | H01Q 1/3233 |
| | | | | 343/711 |
| 2007/0115167 | A1* | 5/2007 | Fujii | H01Q 1/3233 |
| | | | | 342/70 |
| 2007/0117380 | A1* | 5/2007 | Ido | H01Q 1/42 |
| | | | | 438/653 |
| 2007/0139287 | A1* | 6/2007 | Inomata | H01Q 13/02 |
| | | | | 343/786 |
| 2008/0233367 | A1* | 9/2008 | Maeda | H01Q 1/3233 |
| | | | | 428/201 |
| 2008/0309579 | A1* | 12/2008 | Maeda | H01Q 1/42 |
| | | | | 343/872 |
| 2010/0028610 | A1* | 2/2010 | Fujii | H01Q 1/3233 |
| | | | | 428/164 |
| 2011/0047784 | A1* | 3/2011 | Ohtake | G01S 7/03 |
| | | | | 29/600 |
| 2011/0088827 | A1* | 4/2011 | Zanini | B60R 13/005 |
| | | | | 156/63 |
| 2011/0273356 | A1* | 11/2011 | Kawaguchi | C23C 14/35 |
| | | | | 343/873 |
| 2012/0119961 | A1* | 5/2012 | Mayer Pujadas | H01Q 1/38 |
| | | | | 343/713 |
| 2013/0214988 | A1* | 8/2013 | Brady | H01Q 15/0013 |
| | | | | 343/872 |
| 2014/0093665 | A1* | 4/2014 | Horibe | B60R 13/04 |
| | | | | 428/31 |
| 2015/0029487 | A1 | 1/2015 | Nakajima et al. | |
| 2015/0086731 | A1* | 3/2015 | Sugiura | B44C 1/1729 |
| | | | | 428/31 |
| 2015/0140259 | A1* | 5/2015 | Sugiura | B60R 13/005 |
| | | | | 428/72 |
| 2016/0111776 | A1* | 4/2016 | Okumura | H01Q 1/422 |
| | | | | 343/872 |
| 2016/0248152 | A1* | 8/2016 | Takao | H01Q 1/422 |
| 2017/0057424 | A1* | 3/2017 | Yamada | G01S 13/931 |
| 2017/0136739 | A1* | 5/2017 | Okumura | B44C 3/025 |
| 2017/0170554 | A1* | 6/2017 | Rojanski | G02B 1/16 |
| 2017/0352938 | A1* | 12/2017 | Okumura | B60S 1/66 |
| 2018/0056910 | A1* | 3/2018 | Hong | B32B 15/04 |
| 2018/0115059 | A1 | 4/2018 | Tokunaga et al. | |
| 2018/0159207 | A1* | 6/2018 | Shurish | H01Q 1/422 |
| 2018/0254551 | A1* | 9/2018 | Guretzky | G01S 7/032 |
| 2018/0267138 | A1* | 9/2018 | Sakurai | H01Q 15/02 |
| 2019/0115666 | A1* | 4/2019 | Ochiai | H01Q 17/001 |
| 2019/0143909 | A1* | 5/2019 | Mayer Pujadas | H01Q 1/3283 |
| | | | | 342/70 |
| 2019/0271458 | A1* | 9/2019 | Brown | F21S 41/285 |
| 2019/0305411 | A1* | 10/2019 | Mayer Pujadas | H01Q 1/3233 |
| 2020/0300964 | A1 | 9/2020 | Kasaba et al. | |

FOREIGN PATENT DOCUMENTS

| | | |
|---|---|---|
| EP | 3 252 494 A1 | 12/2017 |
| JP | 2004-198617 A | 7/2004 |
| JP | 3612702 B2 | 1/2005 |
| JP | 3646930 B2 | 5/2005 |
| JP | 2017175515 A | 9/2017 |
| JP | 2017215242 A | 12/2017 |
| JP | 2018071984 A | 5/2018 |
| WO | 2018051909 A1 | 3/2018 |

OTHER PUBLICATIONS

Japanese Office Action dated Sep. 1, 2021, issued in corresponding JP Patent Application No. 2018-198286 (and English Machine Translation).

* cited by examiner

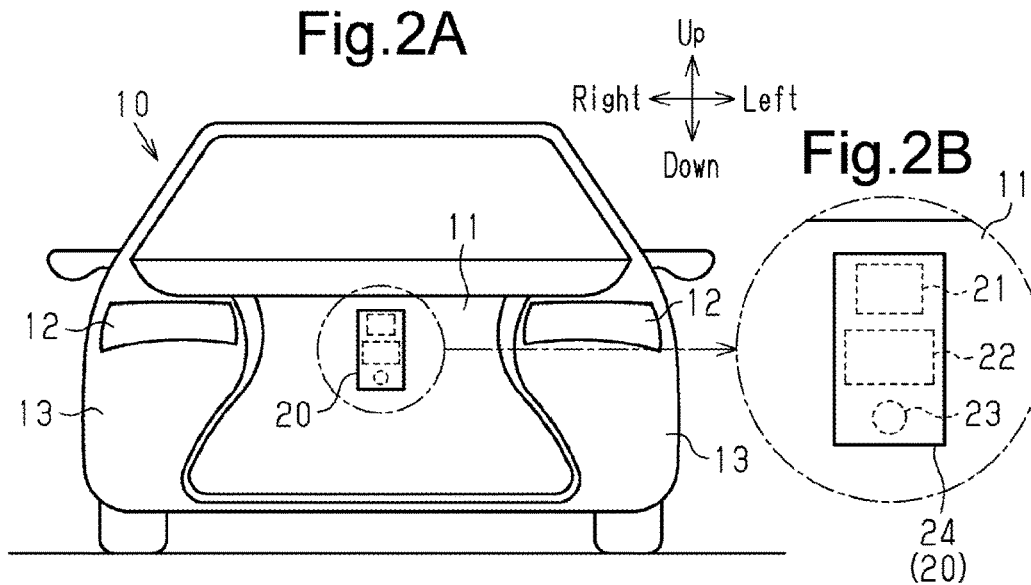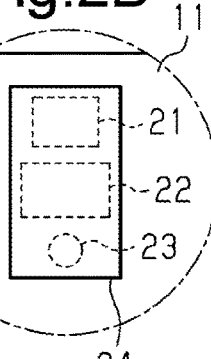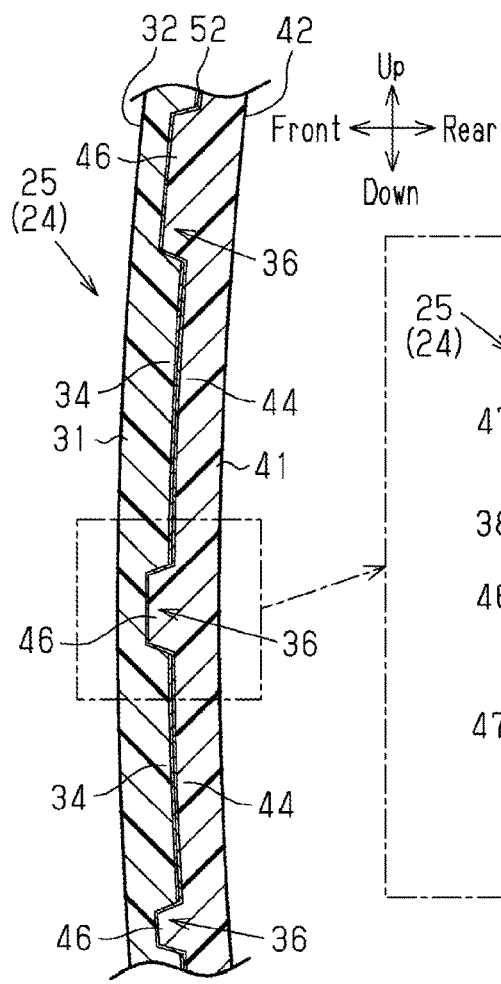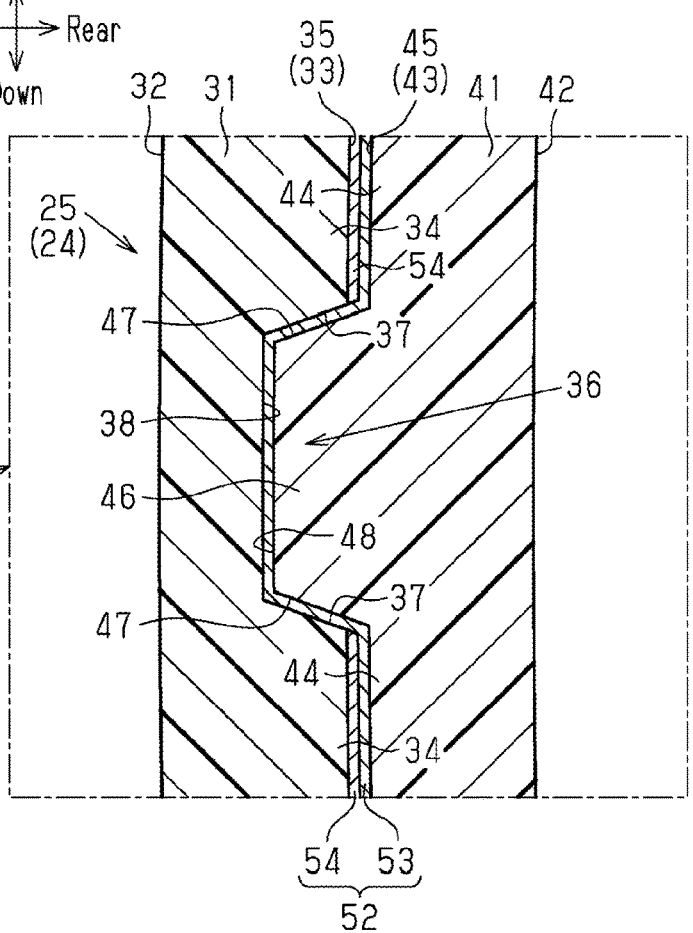

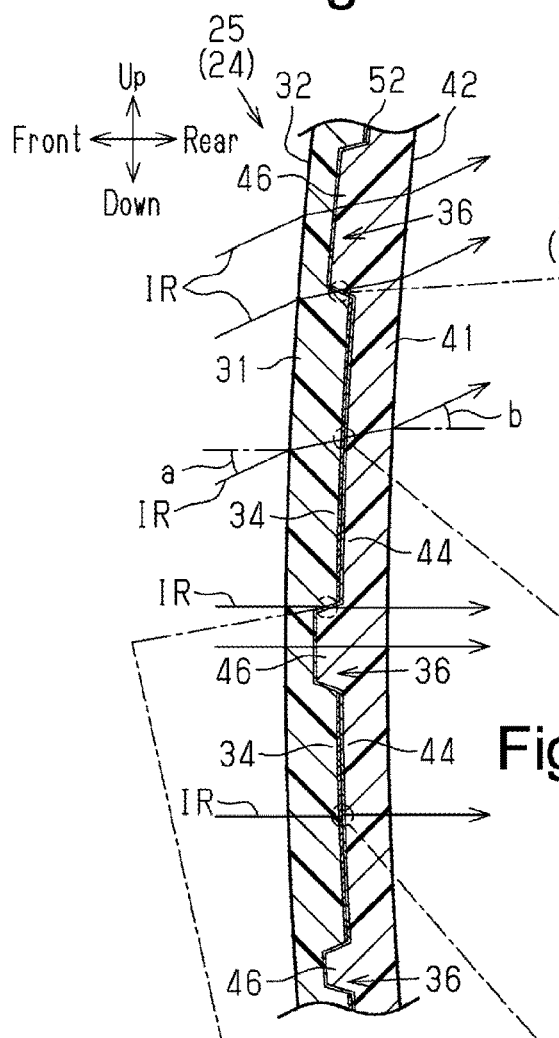
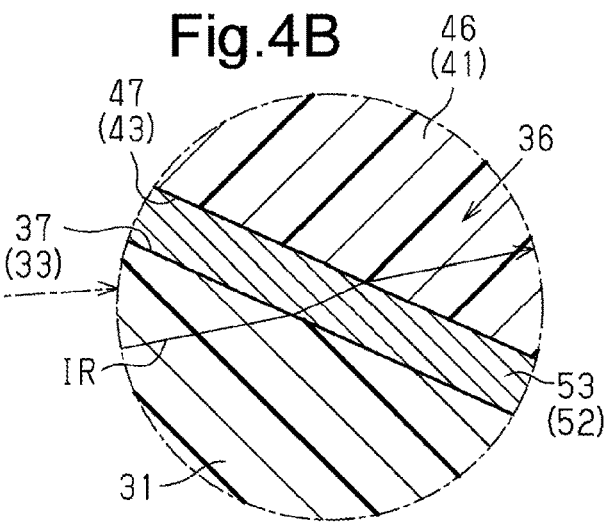
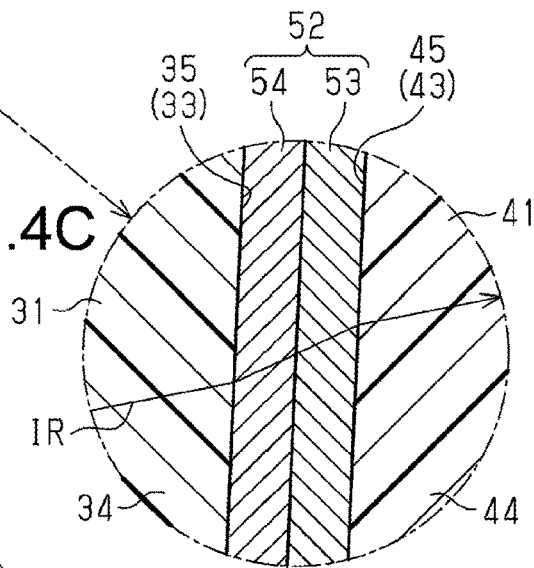
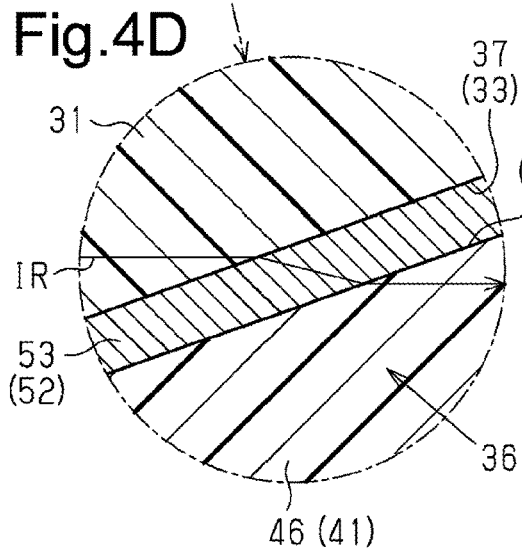
Fig.4A Fig.4B Fig.4C Fig.4D Fig.4E

ONBOARD SENSOR COVER

1. FIELD

The following description relates to an onboard sensor cover applied to a vehicle including an infrared sensor and a millimeter wave radar device as an onboard sensor that detects surrounding situations. The onboard sensor cover is configured to be arranged in front of the infrared sensor in a direction in which infrared rays are transmitted and in front of the millimeter wave radar device in a direction in which millimeter waves are transmitted.

2. DESCRIPTION OF RELATED ART

Infrared sensors and millimeter wave radar devices tend to be installed in a vehicle in order to detect surrounding situations. An infrared sensor transmits infrared rays toward the outside of the vehicle and receives the infrared rays that have struck and have been reflected by an object outside the vehicle including, for example, a leading vehicle and pedestrians. A millimeter wave radar device transmits millimeter waves toward the outside of the vehicle and receives the millimeter waves that have struck and have been reflected by the object outside the vehicle. The infrared rays and millimeter waves are used to recognize the object and detect the distance between the vehicle and the object and the relative speed. When exposed to the outside, the infrared sensor and the millimeter wave radar device are visible from the outer side of the vehicle, thereby adversely affecting the aesthetic appeal. Thus, when the infrared sensor is installed in the vehicle, a sensor cover is arranged in front of the infrared sensor in the transmission direction of the infrared rays to hide the infrared sensor and permit passage of the infrared rays. Further, when the millimeter wave radar device is installed in the vehicle, a sensor cover is arranged in front of the millimeter wave radar device in the transmission direction of the millimeter waves to hide the millimeter wave radar device and permit passage of the millimeter waves.

Recently, there has been a need for installing both the infrared sensor and the millimeter wave radar device in the vehicle. Thus, it is desired that a common onboard sensor cover permit passage of infrared rays and millimeter waves and hide the infrared sensor and the millimeter wave radar device.

However, there have been no onboard sensor covers that permit passage of infrared rays and millimeter waves mainly because an onboard sensor cover for an infrared sensor has the following problems.

FIG. 8A shows a typical onboard sensor cover 80 for an infrared sensor. The onboard sensor cover 80 includes a base 81 and a decorative layer 91, which is provided on the rear surface of the base 81 in the transmission direction of infrared rays. The base 81 is made of a transparent plastic material that permits passage of infrared rays. The decorative layer 91 is made of a material that reflects visible light and permits passage of infrared rays.

Thus, the decorative layer 91 is visible through the transparent base 81 from the front of the onboard sensor cover 80 in the transmission direction, and the onboard sensor cover 80 is decorated by the decorative layer 91. Further, the decorative layer 91, which is located frontward from the infrared sensor in the transmission direction, prevents the infrared sensor from being viewed. This improves the aesthetic appeal of the onboard sensor cover 80 and its surroundings.

To further improve the aesthetic appeal of the onboard sensor cover 80, it is desired that the decorative layer 91 look three-dimensional. For example, as shown in FIGS. 7A and 7B, a front surface 82 of the base 81 in the transmission direction may be configured by a flat surface, and the rear surface of the base 81 in the transmission direction may be configured by an uneven surface 83.

More specifically, a general portion 84 and recesses 86 are provided on the rear part of the base 81 in the transmission direction. The general portion 84 includes a flat general wall surface 85, which is substantially orthogonal to the transmission direction. Each recess 86 is recessed frontward from the general portion 84 in the transmission direction and includes a pair of opposing inclined wall surfaces 87 and a bottom wall surface 88. The inclined wall surfaces 87 are inclined with respect to the transmission direction such that the distance between the inclined wall surfaces 87 decreases toward the front side in the transmission direction. The bottom wall surface 88 includes a flat surface that is substantially orthogonal to the transmission direction. The general wall surface 85, the inclined wall surfaces 87, the bottom wall surface 88, and the like configure the uneven surface 83.

However, the refractive index of the base 81 greatly differs from the refractive index of the atmosphere. Thus, when an infrared ray IR passes through the interface between the inclined wall surface 87 of the recess 86 and the atmosphere, the infrared ray IR greatly refracts to change its travel direction. The angle when the infrared ray IR enters the base 81 from the front surface 82 greatly differs from the angle when the infrared ray IR is emitted from the inclined wall surface 87 of the base 81. Due to this difference, it is difficult for the infrared sensor to correctly recognize the object.

The infrared ray IR is also refracted on the interface between the decorative layer 91 and the base 81 and the interface between the decorative layer 91 and the atmosphere. However, the thickness of the decorative layer 91 is significantly smaller than the thickness of the base 81. Thus, the refraction of the infrared ray IR on the decorative layer 91 has a negligible influence on the refraction of the infrared ray IR on the interface between the base 81 and the atmosphere.

From such a circumstance, the onboard sensor cover 80, which configures the rear surface of the base 81 in the transmission direction by the uneven surface 83 and provides the decorative layer 91 on the uneven surface 83, is useless.

Thus, typically, as shown in FIGS. 8A and 8B, the rear surface of the base 81 in the transmission direction is configured by a single flat surface 89, which is substantially orthogonal to the transmission direction. The decorative layer 91 is provided on the flat surface 89 (refer to, for example, Japanese Laid-Open Patent Publication No. 2004-198617 and Japanese Patent No. 3646930) and a patterned portion 92 of the decorative layer 91 is provided such that the decorative layer 91 looks three-dimensional. For example, as shown in FIG. 8B, when the patterned portion 92 includes straight lines 93, which are arranged in parallel to one another, portions where the distance between adjacent ones of the straight lines 93 is long and portions where the distance between adjacent ones of the straight lines 93 is short are set such that the patterned portion 92 has rough and fine parts. In this case, the long-distance portions (rough portions 94) look as if they are located on the front side (upstream side) in the transmission direction, and the short-distance portions (fine portions 95) look as if they are located on the rear side (downstream side) in the transmission direction.

However, in the typical onboard sensor cover 80 shown in FIGS. 8A and 8B, whereas the patterned portion 92 of the decorative layer 91 looks three-dimensional when the onboard sensor cover 80 is viewed in a particular direction such as from the front side in the transmission direction (direction orthogonal to the front surface 82), the patterned portion 92 of the decorative layer 91 does not look three-dimensional when the onboard sensor cover 80 is viewed from the diagonally front side. Thus, there have been no onboard sensor covers that overcome this problem and permit passage of both infrared rays and millimeter waves.

SUMMARY

It is an objective of the present disclosure to provide an onboard sensor cover that permits passage of millimeter waves without obstructing object recognition by an infrared sensor and makes a decorative layer look three-dimensional regardless of an angle from which the decorative layer is viewed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above-described problem, an onboard sensor cover applied to a vehicle according to a first aspect of the present disclosure is provided. The vehicle includes, as an onboard sensor that detects a surrounding situation, an infrared sensor that transmits an infrared ray toward an outside of the vehicle and receives the infrared ray that has struck and has been reflected by an object outside the vehicle and a millimeter wave radar device that transmits a millimeter wave toward the outside of the vehicle and receives the millimeter wave that has struck and has been reflected by the object outside the vehicle. The onboard sensor cover includes a cover body configured to be arranged in front of the infrared sensor in a transmission direction of the infrared ray and in front of the millimeter wave radar device in a transmission direction of the millimeter wave. The cover body includes a front base made of a transparent plastic material that permits passage of the infrared ray and the millimeter wave, the front base including a rear surface in the transmission directions of the infrared ray and the millimeter wave, the rear surface being configured by a first uneven surface, a rear base made of a plastic material that permits passage of the infrared ray and the millimeter wave and arranged on a rear side of the front base in the transmission directions, the rear base including a front surface in the transmission directions, the front surface being configured by a second uneven surface that corresponds to the first uneven surface of the front base, and a decorative layer made of a material that reflects visible light and permits passage of the infrared ray and the millimeter wave, the decorative layer being in contact with the first uneven surface of the front base and the second uneven surface of the rear base between the front base and the rear base. The front base and the rear base are made of the same type of plastic material.

To solve the above-described problem, an onboard sensor cover applied to a vehicle according to a second aspect of the present disclosure is provided. The vehicle includes, as an onboard sensor that detects a surrounding situation, an infrared sensor that transmits an infrared ray toward an outside of the vehicle and receives the infrared ray that has struck and has been reflected by an object outside the vehicle and a millimeter wave radar device that transmits a millimeter wave toward the outside of the vehicle and receives the millimeter wave that has struck and has been reflected by the object outside the vehicle. The onboard sensor cover includes a cover body configured to be arranged in front of the infrared sensor in a transmission direction of the infrared ray and in front of the millimeter wave radar device in a transmission direction of the millimeter wave. The cover body includes a front base made of a transparent plastic material that permits passage of the infrared ray and the millimeter wave, the front base including a rear surface in the transmission directions of the infrared ray and the millimeter wave, the rear surface being configured by a first uneven surface, a rear base made of a plastic material that permits passage of the infrared ray and the millimeter wave and arranged on a rear side of the front base in the transmission directions, the rear base including a front surface in the transmission directions, the front surface being configured by a second uneven surface that corresponds to the first uneven surface of the front base, and a decorative layer made of a material that reflects visible light and permits passage of the infrared ray and the millimeter wave, the decorative layer being in contact with the first uneven surface of the front base and the second uneven surface of the rear base between the front base and the rear base. The front base and the rear base are made of a plastic material in which a difference in a refractive index between the front base and the rear base is less than or equal to 7%.

To solve the above-described problem, an onboard sensor cover applied to a vehicle according to a third aspect of the present disclosure is provided. The vehicle includes, as an onboard sensor that detects a surrounding situation, an infrared sensor that transmits an infrared ray toward an outside of the vehicle and receives the infrared ray that has struck and has been reflected by an object outside the vehicle and a millimeter wave radar device that transmits a millimeter wave toward the outside of the vehicle and receives the millimeter wave that has struck and has been reflected by the object outside the vehicle. The onboard sensor cover includes a cover body configured to be arranged in front of the infrared sensor in a transmission direction of the infrared ray and in front of the millimeter wave radar device in a transmission direction of the millimeter wave. The cover body includes a front base made of a transparent plastic material that permits passage of the infrared ray and the millimeter wave, the front base including a rear surface in the transmission directions of the infrared ray and the millimeter wave, the rear surface being configured by a first uneven surface, a rear base made of a plastic material that permits passage of the infrared ray and the millimeter wave and arranged on a rear side of the front base in the transmission directions, the rear base including a front surface in the transmission directions, the front surface being configured by a second uneven surface that corresponds to the first uneven surface of the front base, and a decorative layer made of a material that reflects visible light and permits passage of the infrared ray and the millimeter wave, the decorative layer being in contact with the first uneven surface of the front base and the second uneven surface of the rear base between the front base and the rear base. The front base and the rear base are each made of any one of plastic materials of polycarbonate plastic (PC), poly methyl methacrylate plastic (PMMA), and acrylonitrile-butadiene-styrene copolymer plastic (ABS).

The above-described term "transparent" includes not only a colorless and transparent state, but also a colored and transparent state.

Other features and aspects will be apparent from the following detailed description, the drawings, and the claims.

BRIEF DESCRIPTION OF THE DRAWINGS

FIG. 2A is a front view of the vehicle to which the onboard sensor cover of the embodiment is attached.

FIG. 2B is an enlarged partial front view showing a part of FIG. 2A.

FIG. 3A is a partial side cross-sectional view showing the cover body in FIG. 1.

FIG. 3B is an enlarged partial side cross-sectional view showing a part of FIG. 3A.

FIG. 4A is a partial side cross-sectional view showing the cover body of the embodiment and a path through which infrared rays pass.

FIGS. 4B to 4E are enlarged partial cross-sectional side views each showing a part of FIG. 4A.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An onboard sensor cover 24 according to an embodiment will now be described with reference to FIGS. 1 to 6.

Figure 1:
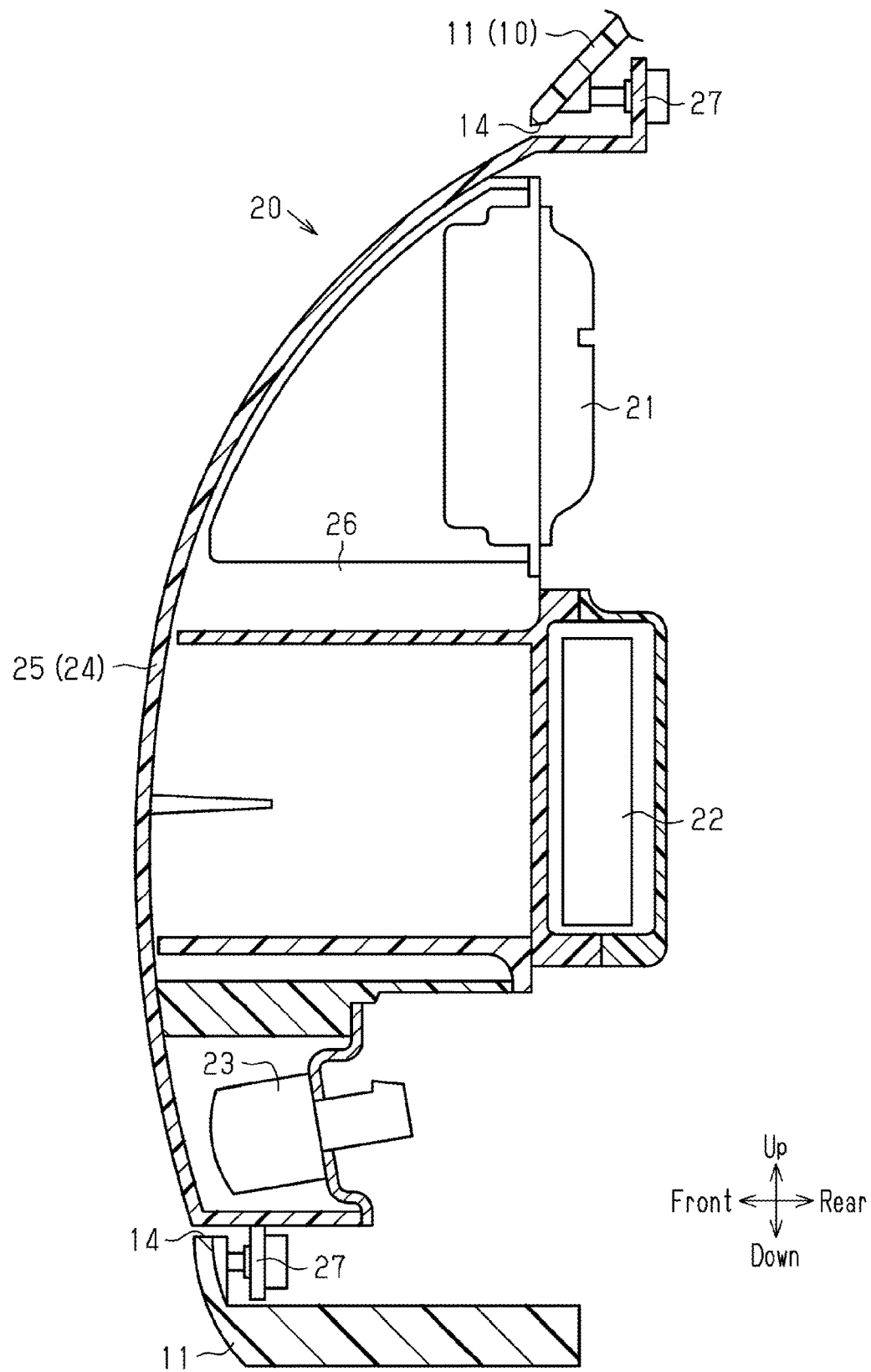
FIG. 1 is a partial side cross-sectional view of an onboard sensor cover according to an embodiment, showing the onboard sensor cover attached to the front end of a vehicle and the surrounding portion of the onboard sensor cover.

In the following description, the direction in which a vehicle 10 travels forward will be referred to as the front, and the reverse direction will be referred to as the rear. The vertical direction refers to the vertical direction of the vehicle 10, and the left-right direction refers to the width direction of the vehicle 10 that matches with the left-right direction when the vehicle 10 is moving forward. In FIG. 3A to FIG. 4E, the dimensions of components of the onboard sensor cover 24 are changed such that the components are recognizable. The same applies to FIG. 7A to FIG. 8B, which illustrate the related art. To facilitate understanding, FIG. 1 shows that a cover body 25 of the onboard sensor cover 24 is configured by a single member. However, as shown in FIG. 3A, the cover body 25 is configured by multiple members. The details will be described below.

As shown in FIG. 2A, the vehicle 10 includes a radiator grille 11, a pair of headlights 12, and a pair of bumper-integrated fenders 13 as vehicle exterior parts, which are attached to the front end of the vehicle body of the vehicle 10. The headlights 12 and the bumper-integrated fenders 13 are arranged on the left and right sides of the radiator grille 11. The radiator grille 11 guides outside air such as relative wind to a radiator (not shown) to cool the radiator.

As shown in FIG. 1, a quadrilateral window 14 opens in the upper part of the radiator grille 11, and a vehicle sensor unit 20 is arranged between the window 14 and the radiator.

As shown in FIGS. 1 and 2B, the vehicle sensor unit 20 includes a millimeter wave radar device 21, an infrared sensor 22, a camera 23, and the onboard sensor cover 24. The millimeter wave radar device 21, the infrared sensor 22, and the camera 23 are onboard sensors that detect surrounding situations of the vehicle 10 and are laid out in the vertical direction. The onboard sensor cover 24 covers the millimeter wave radar device 21, the infrared sensor 22, and the camera 23 from the front of the vehicle 10.

The millimeter wave radar device 21 transmits millimeter waves toward the outside of the vehicle, more specifically, toward a predetermined angular range in front of the vehicle 10 and receives millimeter waves that have struck and have been reflected by an object outside the vehicle including a leading vehicle, pedestrians, and the like. Millimeter waves are radio waves with wavelengths of 1 mm to 10 mm and frequencies of 30 GHz to 300 GHz. The millimeter wave radar device 21 recognizes the object outside the vehicle from the time difference between transmitted millimeter waves and received millimeter waves, the strength of received waves, and the like and detects the distance between the vehicle 10 and the object and the relative speed. The millimeter wave radar device 21 is characterized by being resistant to bad weather such as rain, fog, and snow, and having a longer detectable distance than other modes.

The infrared sensor 22 is located below and adjacent to the millimeter wave radar device 21. The infrared sensor 22 transmits infrared rays toward the front of the vehicle 10 over a broader angular range than the millimeter wave radar device 21 and receives the infrared rays that have struck and have been reflected by the object outside the vehicle such as a leading vehicle, pedestrians, and the like. Infrared ray is a kind of electromagnetic wave and has a longer wavelength than the wavelength of visible light (0.36 μm to 0.83 μm). The infrared sensor 22 detects objects closer to the vehicle 10 than objects to be detected by the millimeter wave radar device 21. Based on the transmitted infrared rays and the received infrared rays, the infrared sensor 22 recognizes the object outside the vehicle and detects the distance between the vehicle 10 and the object and the relative speed.

The camera 23 is located below and adjacent to the infrared sensor 22. The camera 23 is located at a position deviated both from a detection region of the millimeter wave radar device 21 and a detection region of the infrared sensor 22. The detection region of the millimeter wave radar device 21 refers to a region for passage of millimeter waves transmitted from the millimeter wave radar device 21 and millimeter waves that have struck and have been reflected by the object. The detection region of the infrared sensor 22 refers to a region for passage of infrared rays transmitted from the infrared sensor 22 and infrared rays that have struck and have been reflected by the object.

As described above, the millimeter wave radar device 21 transmits millimeter waves toward the front of the vehicle 10, and the infrared sensor 22 transmits infrared rays toward the front of the vehicle 10. Thus, the millimeter wave radar device 21 transmits millimeter waves and the infrared sensor 22 transmits infrared rays in a direction from the rear to the front of the vehicle 10. The front in the transmission direction of millimeter waves and infrared rays matches the front of the vehicle 10, and the rear in the transmission direction matches the rear of the vehicle 10. Thus, in the following description, the front in the transmission direction of millimeter waves and infrared rays is simply referred to as "frontward" or "front," and the rear in the transmission direction is simply referred to as "rearward" or "rear."

The onboard sensor cover 24 includes the cover body 25 and an attachment portion 26. The cover body 25 has a shape corresponding to the window 14 of the radiator grille 11 (rectangular shape) and is arranged on the window 14. The attachment portion 26 is provided on the rear side of the cover body 25. The millimeter wave radar device 21, the infrared sensor 22, and the camera 23 are attached to the attachment portion 26 to configure the vehicle sensor unit 20 as a single unit.

The cover body 25 includes mount portions 27 at least on its upper end and lower end. At the mount portions 27, the cover body 25 is attached to the radiator grille 11 or a peripheral portion of the window 14 in the vehicle body through, for example, engagement of clips, screws, or tabs.

As shown in FIGS. 3A and 3B, most of the cover body 25 except the mount portions 27 includes a front base 31, a decorative layer 52, and a rear base 41.

The front base 31 is made of a transparent plastic material that permits passage of millimeter waves and infrared rays. The term "transparent" in this specification includes not only a colorless and transparent state, but also a colored and transparent state. The front base 31 includes a front surface 32, which is configured by a single flat surface that is substantially orthogonal to the front-rear direction. The front surface 32 includes a design surface of the onboard sensor cover 24. The rear surface of the front base 31 is configured by a first uneven surface 33.

More specifically, the rear part of the front base 31 is provided with a general portion 34, which includes a flat general wall surface 35 that is substantially orthogonal to the front-rear direction, and recesses 36, which are recessed frontward from the general portion 34. The recesses 36 each include a pair of inclined wall surfaces 37, which are opposed to each other in the vertical direction, and a bottom wall surface 38. The inclined wall surfaces 37 are inclined with respect to the front-rear direction such that the distance between the inclined wall surfaces 37 decreases toward the front side. The bottom wall surface 38 is configured by a flat surface that is substantially orthogonal to the front-rear direction. The general wall surface 35, the inclined wall surfaces 37, and the bottom wall surface 38 configure part of the first uneven surface 33.

The rear base 41 is made of a plastic material that permits passage of millimeter waves and infrared rays and is arranged on the rear side of the front base 31. The rear base 41 includes a rear surface 42, which is configured by a single flat surface that is substantially orthogonal to the front-rear direction. The rear base 41 includes a front surface configured by a second uneven surface 43, which corresponds to the first uneven surface 33 of the front base 31.

More specifically, the portion serving as the front part of the rear base 41 and the rear part of the general portion 34 of the front base 31 is provided with a general portion 44, which includes a flat general wall surface 45, which is substantially orthogonal to the front-rear direction. The portion serving as the front part of the rear base 41 and the rear part of each recess 36 of the front base 31 is provided with a protrusion 46, which protrudes frontward from the general portion 44 and into the recess 36. The protrusion 46 includes a pair of inclined wall surfaces 47 and a top wall surface 48. The inclined wall surfaces 47 are inclined with respect to the front-rear direction such that the distance between the inclined wall surfaces 47 decreases toward the front side. The top wall surface 48 is configured by a flat surface that is substantially orthogonal to the front-rear direction. The general wall surface 45, the inclined wall surfaces 47, and the top wall surface 48 configure part of the second uneven surface 43.

The front base 31 and the rear base 41 are made of plastic materials in which the difference in refractive index between the front base 31 and the rear base 41 is less than or equal to 7%. The plastic material mainly includes polycarbonate plastic (PC), poly methyl methacrylate plastic (PMMA), and transparent acrylonitrile-butadiene-styrene copolymer plastic (ABS). The refractive index of PC is 1.59, the refractive index of PMMA is 1.49, and the refractive index of transparent ABS is 1.57.

Other transparent plastics such as methyl methacrylate-styrene copolymer plastic (MBS), polyamide plastic (PA), and polystyrene plastic (PS) may also be used. The refractive index of MBS is 1.50, the refractive index of PA is 1.51, and the refractive index of transparent PS is 1.60.

The front base 31 and the rear base 41 are made of any one of multiple types of plastic materials including PC, PMMA, and transparent ABS. The front base 31 and the rear base 41 may be made of the same type of plastic material or may be made of different types of plastic materials. In the present embodiment, the front base 31 and the rear base 41 are both made of PC. Thus, the front base 31 and the rear base 41 have the same refractive index. PC has a relative permittivity of 2.9 to 3.0. The relative permittivity refers to the ratio of the permittivity of the front base 31 (rear base 41) to the permittivity of a vacuum. The permittivity refers to a physical property indicating the degrees of characteristics that cause dielectric polarization to occur in the electric charges of matter.

The decorative layer 52 decorates the onboard sensor cover 24 and has a thickness of several micrometers to several tens of micrometers. The decorative layer 52 is made of a material that reflects visible light and permits passage of infrared rays and millimeter waves. The decorative layer 52 is in close contact with the first uneven surface 33 and the second uneven surface 43 between the front base 31 and the rear base 41. The decorative layer 52 includes a bright decorative layer 53 and a colored decorative layer 54. The ornamental portion represented by the decorative layer 52 includes, for example, a background part and a patterned part such as characters and marks. The background part is configured by, for example, the colored decorative layer 54. The patterned part is configured by, for example, the bright decorative layer 53.

The colored decorative layer 54 includes an infrared ray passage ink (IR ink) layer made of an infrared ray passage ink and is, for example, black, blue, or red. IR ink is known as a material having a high light transmittance of infrared rays and a low light transmittance of visible light. The colored decorative layer 54 may have a single color or may be patterned by multiple colors. The colored decorative layer 54 is formed by, for example, performing printing such as screen printing on the general wall surface 35 of the front base 31.

The bright decorative layer 53 is formed by performing sputtering, vapor deposition, or coating on the inclined wall surface 37 and the bottom wall surface 38 of the front base 31 and on the entire rear surface of the colored decorative layer 54. Thus, the decorative layer 52 has a double-layer structure including the colored decorative layer 54 and the bright decorative layer 53 on the general wall surface 35 of the front base 31. In the present embodiment, the bright decorative layer 53 includes a dielectric multilayer film (i.e., cold mirror layer). The dielectric multilayer film is a film formed by alternately laminating a first dielectric thin film made of a high refractive-index material and a second dielectric thin film made of a low refractive-index material, which has a lower refractive index than the high refractive-index material. The high refractive-index material includes, for example, titanium dioxide ($TiO_2$), aluminum oxide ($AL_2O_3$), and zirconium oxide ($ZrO_2$). The low refractive-index material includes, for example, silicon dioxide ($SiO_2$), zinc peroxide ($ZnO_2$), and magnesium fluoride ($MgF_2$).

For example, a dielectric multilayer film formed by alternately overlapping five first dielectric thin films made of titanium dioxide ($TiO_2$) and five second dielectric thin films made of silicon dioxide ($SiO_2$) with each other can be used as the bright decorative layer 53.

The decorative layer 52 is not provided on a portion of the cover body 25 that serves as the front side in an image-capturing direction of the camera 23. This portion of the cover body 25 permits passage of visible light. Thus, the camera 23 can be used to capture the images of the surroundings of the vehicle 10 through outside light that passes through this portion of the cover body 25.

It is desired that the camera 23 have the same color as the colored decorative layer 54, which configures the background part of the ornamental portion by the decorative layer 52. In this case, while the camera 23 is visually recognizable from the front of the vehicle 10 through the cover body 25, the camera 23 is unnoticed.

The cover body 25 is required to have a small amount of attenuation that occurs when millimeter waves pass through the cover body 25. It has been found that the attenuation amount of millimeter waves has a certain relationship with the thickness of the cover body 25. That is, it has been found that when thicknesses are set to satisfy a certain condition (refer to the following Equation 1), the attenuation amount is smaller in the thicknesses than in other thicknesses.

Thus, in the present embodiment, when the thickness of the portion of the cover body 25 excluding the mount portion 27 is set as T, the wavelength of a millimeter wave is set as $\lambda e$, the relative permittivity of the bases (the average value of the relative permittivity of the front base and the rear base) is set as $\epsilon p$, and an integer is set as n, the thickness T is set to a value that satisfies the following Equation 1.

$$T=\{(\lambda e/2)/\sqrt{(\epsilon p)}\}n \qquad \text{Equation 1}$$

In this manner, the thickness T of the cover body 25 is set to a value that is an integral multiple of a value obtained by dividing a half-wavelength by the square root of the average value of the relative permittivity. When the front base 31 and the rear base 41 are made of PC, the thickness T is set to, for example, 2.4 mm or 3.6 mm. In this setting, the attenuation amount of millimeter waves passing through the cover body 25 is limited to less than or equal to 2.0 dB, which is an allowable value.

Figure 5:
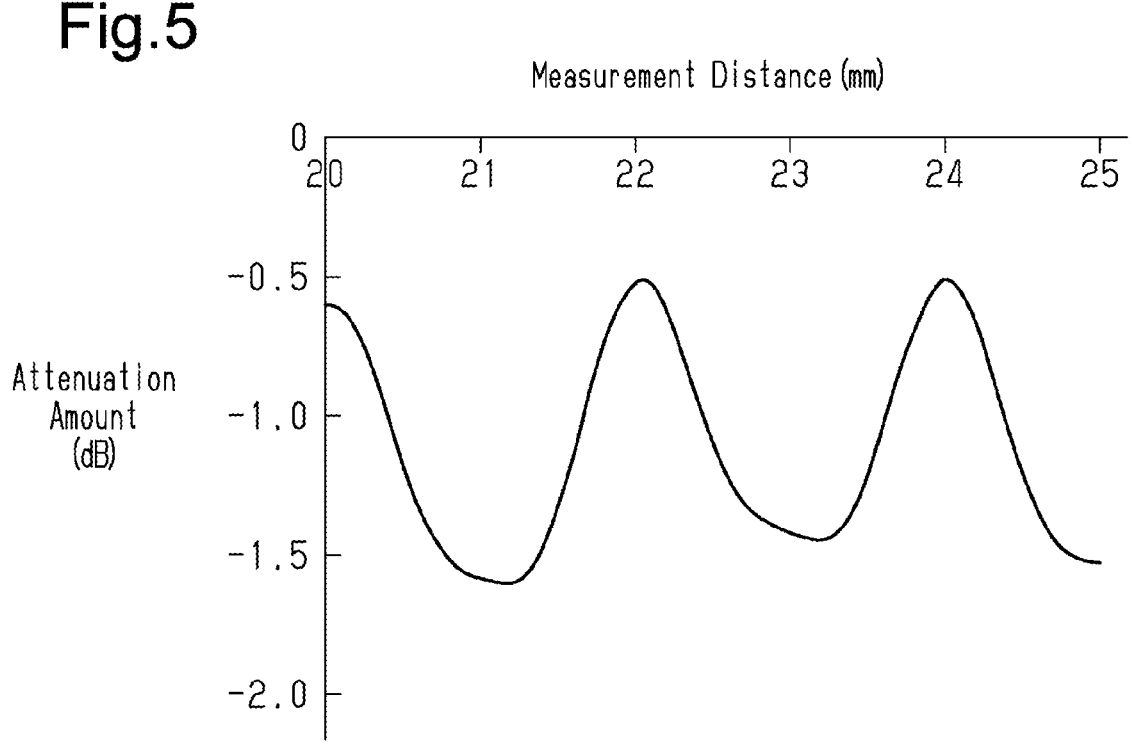
FIG. 5 is a graph illustrating the result of measuring the relationship between the attenuation amount of a millimeter wave and the distance (measurement distance) from the millimeter wave radar device to the cover body of the onboard sensor cover.

FIG. 5 illustrates the result of measuring the relationship between the distance (measurement distance) from the millimeter wave radar device 21 to the cover body 25 and the attenuation amount of a millimeter wave passing through the cover body 25. FIG. 5 reveals that the attenuation amount of the millimeter wave increases and decreases in accordance with the distance (measurement distance). The increase and decrease are caused by the interference between millimeter waves that have struck and have been reflected by the onboard sensor cover 24 with millimeter waves transmitted from the millimeter wave radar device 21 and by reinforcement and attenuation of the millimeter waves in accordance with the distance. FIG. 5 also reveals that the attenuation amount is limited to 2.0 dB or lower even at the maximum.

The transmittance of infrared rays in the cover body 25 is greater than or equal to 70%, which is an allowable value. Thus, the onboard sensor cover 24, which is arranged on an optical path of infrared rays, is unlikely to obstruct a normal operation of the infrared sensor 22.

Figure 6:
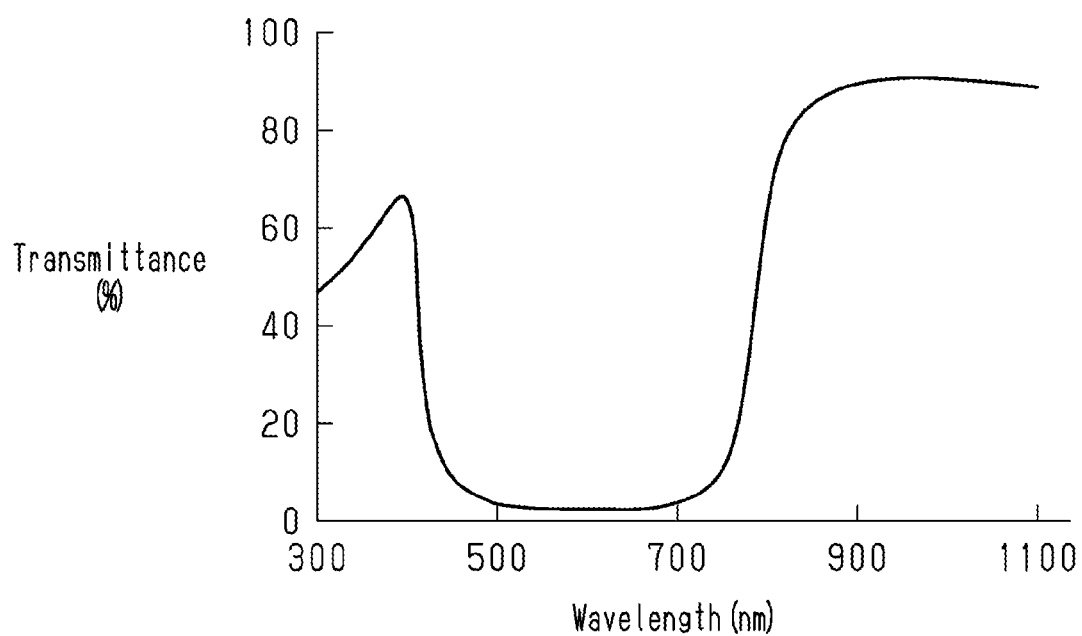
FIG. 6 is a graph illustrating the result of measuring the relationship between the transmittance and wavelength of an infrared ray in the cover body of the onboard sensor cover.

FIG. 6 illustrates the result of measuring the relationship between the transmittance and wavelength of the infrared ray IR in the cover body 25, in which the bright decorative layer 53 is configured by a dielectric multilayer film (cold mirror layer). FIG. 6 reveals that the transmittance of the infrared ray IR is greater than or equal to 70% in a wavelength region of 850 nm or longer.

Further, the vehicle 10 is equipped with an electronic control unit (not shown). The millimeter wave radar device 21, the infrared sensor 22, and the camera 23 are connected to the electronic control unit. The electronic control unit executes various types of processes to support the driving of the vehicle 10 according to the surrounding situations of the vehicle 10, which are obtained from output signals of the millimeter wave radar device 21, the infrared sensor 22, and the camera 23. The processes include a process of warning that the vehicle 10 may deviate from the lane, a process of warning that the vehicle 10 may collide, and a process of automatically adjusting the distance between vehicles.

The operation and advantages of the onboard sensor cover 24 of the above-described embodiment will now be described.

When visible light enters the cover body 25 of the onboard sensor cover 24 from the front of the vehicle 10, the visible light passes through the front base 31 and reflects on the colored decorative layer 54 and the bright decorative layer 53 in the decorative layer 52. The reflection of the visible light on the bright decorative layer 53, which is configured by a cold mirror layer, shines like metal. Further, the reflection of the visible light on the colored decorative layer 54, which is configured by an infrared ray passage ink, results in colored ornamentation.

When the onboard sensor cover 24 is viewed from the front of the vehicle 10, the decorative layer 52 looks as if it is located on the rear side (downstream side) of the front base 31 through the front base 31. The color of the colored decorative layer 54 is visible in the colored decorative layer 54 of the decorative layer 52. The bright decorative layer 53 of the decorative layer 52 looks shiny like metal. In this manner, the decorative layer 52 ornaments the onboard sensor cover 24, thereby increasing the aesthetic appeal of the onboard sensor cover 24 and its peripheral portions.

Figure 8A:
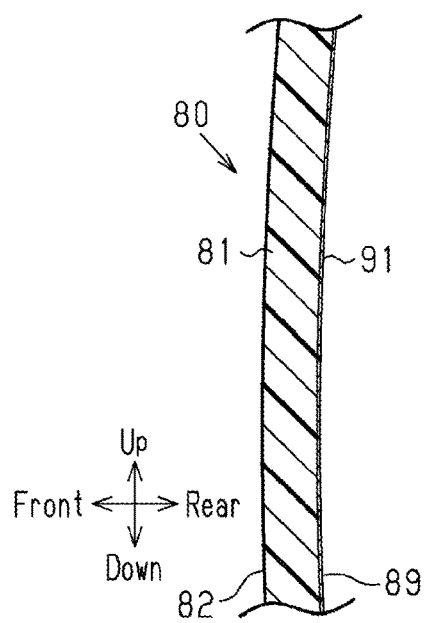
FIG. 8A is a partial side cross-sectional view of a typical onboard sensor cover in which the rear surface of a base is configured by a flat surface and a decorative layer is provided on the flat surface.
Figure 8B:
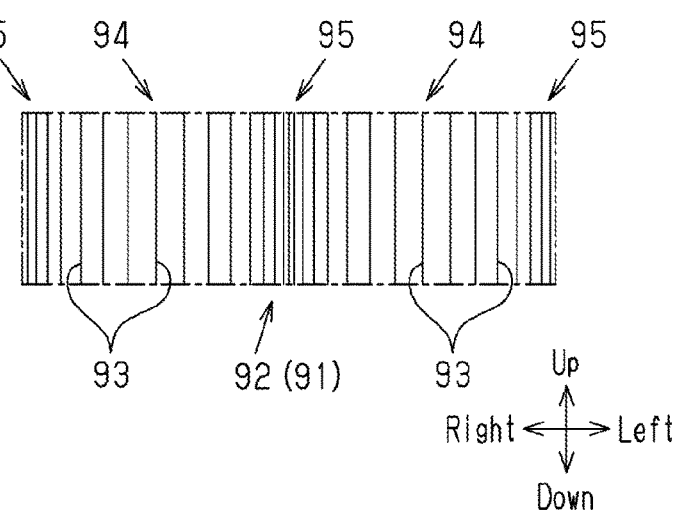
FIG. 8B is a partial front view illustrating the patterned portion of the decorative layer in FIG. 8A.

The rear surface of the front base 31 is configured by the first uneven surface 33. The decorative layer 52 is provided on the first uneven surface 33 and is uneven. Thus, when the onboard sensor cover 24 is viewed from the front of the vehicle 10, the recessed part of the decorative layer 52 (i.e., the bright decorative layer 53 on the inclined wall surface 37 and the bottom wall surface 38) looks as if it is located frontward from (located upstream of) the colored decorative layer 54 on the general wall surface 35. In other words, the entire decorative layer 52 looks as if it is three-dimensional in the front-rear direction. This further increases the aesthetic appeal of the onboard sensor cover 24 and its peripheral portions. Such an effect is not easily obtained from the typical onboard sensor cover 80, in which the rear surface of the base 81 is configured by the single flat surface 89 and the decorative layer 91 is provided on the flat surface 89, as shown in FIGS. 8A and 8B.

The reflection of visible light on the decorative layer 52 occurs in front of the infrared sensor 22 and in front of the millimeter wave radar device 21. The decorative layer 52 hides the infrared sensor 22 and the millimeter wave radar device 21. Thus, the infrared sensor 22 and the millimeter wave radar device 21 are difficult to see from the front of the onboard sensor cover 24.

Thus, as compared to an onboard sensor cover in which the infrared sensor 22 and the millimeter wave radar device 21 are incorporated into the vehicle body in an exposed state or an onboard sensor cover in which the infrared sensor 22 and the millimeter wave radar device 21 look transparent through the cover body 25 of the onboard sensor cover 24, the aesthetic appeal of the onboard sensor cover 24 and its peripheral portions is improved.

When infrared rays are transmitted from the infrared sensor 22 toward the outside of the vehicle, the infrared rays pass through the rear base 41, the decorative layer 52, and the front base 31 of the cover body 25 in this order. The infrared rays that have struck and have been reflected by an object outside the vehicle including a leading vehicle and pedestrians pass through the front base 31, the decorative layer 52, and the rear base 41 in this order and are then received by the infrared sensor 22. Based on the transmitted and received infrared rays, the infrared sensor 22 recognizes the object outside the vehicle and detects the distance between the vehicle 10 and the object and the relative speed.

When millimeter waves are transmitted from the millimeter wave radar device 21 toward the outside of the vehicle, the millimeter waves pass through the rear base 41, the decorative layer 52, and the front base 31 of the cover body 25 in this order. The millimeter waves that have struck and have been reflected by the object outside the vehicle including a leading vehicle and pedestrians pass through the front base 31, the decorative layer 52, and the rear base 41 in this order and are then received by the millimeter wave radar device 21. Based on the transmitted and received millimeter waves, the millimeter wave radar device 21 recognizes the object outside the vehicle and detects the distance between the vehicle 10 and the object and the relative speed.

The thickness T of the cover body 25 of the onboard sensor cover 24 is set to a value that satisfies the above-described Equation 1. Thus, as compared to when the thickness T is set to a value that does not satisfy Equation 1, the attenuation amount of millimeter waves passing through the cover body 25 decreases. This allows the millimeter wave radar device 21 to recognize the object outside the vehicle and detect the distance between the vehicle 10 and the object and the relative speed as described above.

The image of an external situation of the vehicle 10 is captured by the camera 23 through a part of the cover body 25 where the decorative layer 52 is not provided.

In the present embodiment, since the front base 31 and the rear base 41 are made of the same type of plastic material (PC), the front base 31 and the rear base 41 have the same refractive index. Thus, the travel directions of the infrared rays IR shown by the arrows in FIGS. 4A to 4E do not greatly change when passing through the interface of the front base 31 and the rear base 41.

In FIG. 4D, the infrared ray IR enters the front base 31 from the front substantially perpendicularly to pass through the inclined wall surfaces 37 and 47. In FIG. 4E, the infrared ray IR enters the front base 31 from the front substantially perpendicularly to pass through the general wall surfaces 35 and 45. In either case, the infrared ray IR is emitted substantially perpendicularly from the rear surface 42 toward the rear after passing through the rear base 41.

In FIG. 4B, the infrared ray IR enters the front base 31 from the diagonally front lower side to pass through the inclined wall surfaces 37 and 47. In FIG. 4C, the infrared ray IR enters the front base 31 from the diagonally front lower side to pass through the general wall surfaces 35 and 45. In either case, the infrared ray IR is emitted from the rear surface 42 toward the diagonally rear upper side after passing through the rear base 41.

The front base 31 and the rear base 41 are made of the same type of plastic material. Thus, in FIGS. 4A to 4E, an angle a when the infrared ray IR enters the front base 31 from the atmosphere is the same as an angle b when the infrared ray IR is emitted from the rear base 41 to the atmosphere.

The infrared ray IR is also refracted on the interface between the front base 31 and the decorative layer 52 (general wall surface 35, inclined wall surface 37, and bottom wall surface 38) and the interface between the decorative layer 52 and the rear base 41 (general wall surface 45, inclined wall surface 47, and top wall surface 48). However, the thickness of the decorative layer 52 is from several nanometers to several tens of nanometers, which is relatively small, both in the thin part of the decorative layer 52 configured only by the bright decorative layer 53 (FIGS. 4B and 4D) and in the thick part of the decorative layer 52 configured by the bright decorative layer 53 and the colored decorative layer 54 (FIGS. 4C and 4E). The thickness of the decorative layer 52 is significantly smaller than the thickness of the front base 31 and the thickness of the rear base 41, both of which are several millimeters. Thus, the refraction of the infrared ray IR on the decorative layer 52 is so small that the influence on the refraction of the infrared ray IR on the interface between the front base 31 and the rear base 41 can be ignored.

Figure 7A:
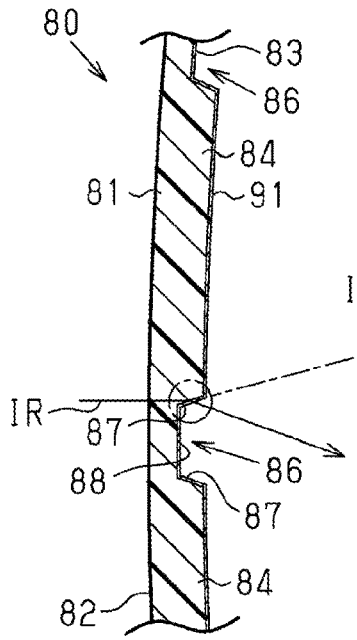
FIG. 7A is a partial side cross-sectional view of a typical onboard sensor cover, showing a hypothetical onboard sensor cover in which the rear surface of a base is configured by an uneven surface and a decorative layer is provided on the uneven surface.
Figure 7B:
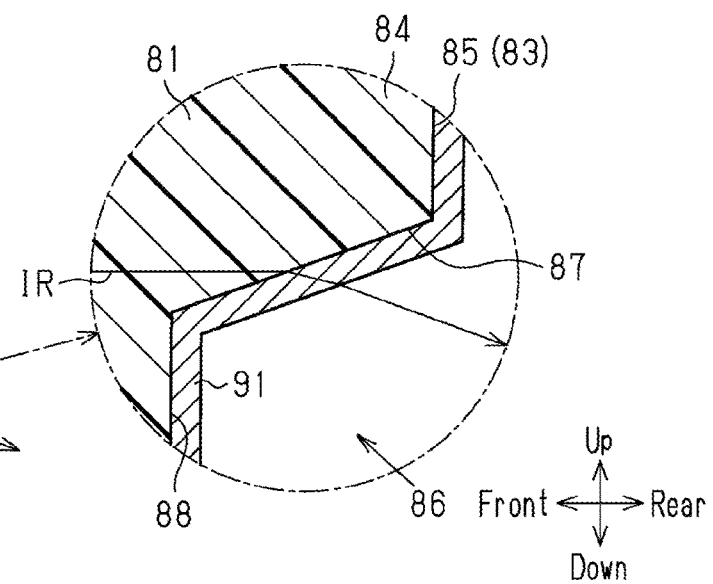
FIG. 7B is an enlarged side partial cross-sectional view illustrating a part of FIG. 7A.

Accordingly, the onboard sensor cover 24 is prevented from incorrectly recognizing the object due to a large refraction of the infrared ray IR on the interface. This differs from the typical onboard sensor cover 80, which includes the base 81 having the rear surface configured by the uneven surface 83, and the decorative layer 91 in close contact with the uneven surface 83 as shown in FIGS. 7A and 7B.

The above-described embodiment may be modified as follows.

The front base 31 and the rear base 41 may be made of the same type of plastic material among multiple types of transparent plastic materials including PC, PMMA, and transparent ABS, which have been described above. In this case, the front base 31 and the rear base 41 have the same refractive index. Thus, the same operation and advantages as the above-described embodiment can be gained.

The front base 31 and the rear base 41 may be made of different types of plastic materials. In this case, plastic materials in which the difference in the refractive index between the front base 31 and the rear base 41 is less than or equal to 7% are selected. Two of the multiple types of transparent plastic materials including PC, PMMA, and transparent ABS are selected.

In this case, the refractive index of the front base 31 is approximate to the refractive index of the rear base 41. Thus, the same operation and advantages as the above-described embodiment can be gained.

In a manner opposite to the above-described embodiment, the bright decorative layer 53 may be provided on the general wall surface 35, and the colored decorative layer 54 may be provided on the inclined wall surface 37 and the bottom wall surface 38 in the recess 36.

The decorative layer 52 may include only the bright decorative layer 53. Alternatively, the decorative layer 52 may include only the colored decorative layer 54.

The colored decorative layer 54 may be formed by performing painting on the general wall surface 35 of the front base 31.

In the onboard sensor cover 24, it is desired that the thickness T of the cover body 25 be set to a value that satisfies Equation 1 to reduce the attenuation amount of millimeter waves. Instead, when the attenuation of a larger amount of millimeter waves than the above-described embodiment is allowable, the thickness T may be set to a value that does not satisfy Equation 1.

The onboard sensor cover 24 is applicable to a vehicle 10 including, among the infrared sensor 22, the millimeter wave radar device 21, and the camera 23, only the infrared sensor 22 and the millimeter wave radar device 21 as an onboard sensor that detects surrounding situations of the vehicle 10.

The onboard sensor cover 24 is also applicable to a vehicle 10 including the millimeter wave radar device 21, the infrared sensor 22, and the camera 23 such that they are arranged differently from the onboard sensor cover of the above-described embodiment. For example, the millimeter wave radar device 21, the infrared sensor 22, and the camera 23 may be laid out in the left-right direction. Alternatively, the millimeter wave radar device 21, the infrared sensor 22, and the camera 23 may be arranged such that the positions thereof in the vertical direction are changed.

The onboard sensor cover 24 is also applicable to a vehicle 10 in which an onboard sensor is arranged at a position in the radiator grille 11 that differs from the position of the radiator grille 11 of the above-described embodiment (i.e., at the upper part).

The onboard sensor cover 24 is also applicable to a vehicle 10 in which an onboard sensor is arranged at a position that is located at the front end of the vehicle 10 and differs from the position of the radiator grille 11 (for example, located below the headlight 12 or incorporated in the bumper-integrated fender 13).

The onboard sensor cover 24 is applicable to a vehicle 10 in which an onboard sensor is arranged at an outer end other than the front end, for example, the rear end or the side end.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An onboard sensor cover applied to a vehicle, the vehicle including, as an onboard sensor that detects a surrounding situation, an infrared sensor that transmits an infrared ray toward an outside of the vehicle and receives the infrared ray that has struck and has been reflected by an object outside the vehicle and a millimeter wave radar device that transmits a millimeter wave toward the outside of the vehicle and receives the millimeter wave that has struck and has been reflected by the object outside the vehicle, wherein the onboard sensor cover comprises a cover body configured to be arranged in front of the infrared sensor in a transmission direction of the infrared ray and in front of the millimeter wave radar device in a transmission direction of the millimeter wave, the cover body includes
a front base made of a transparent plastic material that permits passage of the infrared ray and the millimeter wave, the front base including a rear surface in the transmission directions of the infrared ray and the millimeter wave, the rear surface being configured by a first uneven surface,
a rear base made of a plastic material that permits passage of the infrared ray and the millimeter wave and arranged on a rear side of the front base in the transmission directions, the rear base including a front surface in the transmission directions, the front surface being configured by a second uneven surface that corresponds to the first uneven surface of the front base, and
a decorative layer made of a material that reflects visible light and permits passage of the infrared ray and the millimeter wave, the decorative layer being in contact with the first uneven surface of the front base and the second uneven surface of the rear base between the front base and the rear base, and the front base and the rear base are made of the same type of plastic material.

2. The onboard sensor cover according to claim 1, wherein the decorative layer includes at least one of a cold mirror layer or an infrared ray passage ink layer.

3. The onboard sensor cover according to claim 1, wherein when a thickness of the cover body is set as T, a wavelength of the millimeter wave is set as $\lambda e$, an average value of a relative permittivity of the front base and the rear base is set as $\varepsilon p$, and an integer is set as n, the thickness T is set to a value that satisfies an equation, $$T=\{(\lambda e/2)/\sqrt{(\varepsilon p)}\}n.$$

4. An onboard sensor cover applied to a vehicle, the vehicle including, as an onboard sensor that detects a surrounding situation, an infrared sensor that transmits an infrared ray toward an outside of the vehicle and receives the infrared ray that has struck and has been reflected by an object outside the vehicle and a millimeter wave radar device that transmits a millimeter wave toward the outside of the vehicle and receives the millimeter wave that has struck and has been reflected by the object outside the vehicle, wherein the onboard sensor cover comprises a cover body configured to be arranged in front of the infrared sensor in a transmission direction of the infrared ray and in front of the millimeter wave radar device in a transmission direction of the millimeter wave, the cover body includes a front base made of a transparent plastic material that permits passage of the infrared ray and the millimeter wave, the front base including a rear surface in the transmission directions of the infrared ray and the millimeter wave, the rear surface being configured by a first uneven surface, a rear base made of a plastic material that permits passage of the infrared ray and the millimeter wave and arranged on a rear side of the front base in the transmission directions, the rear base including a front surface in the transmission directions, the front surface being configured by a second uneven surface that corresponds to the first uneven surface of the front base, and a decorative layer made of a material that reflects visible light and permits passage of the infrared ray and the millimeter wave, the decorative layer being in contact with the first uneven surface of the front base and the second uneven surface of the rear base between the front base and the rear base, and the front base and the rear base are made of a plastic material in which a difference in a refractive index between the front base and the rear base is less than or equal to 7%.

5. The onboard sensor cover according to claim 4, wherein the decorative layer includes at least one of a cold mirror layer or an infrared ray passage ink layer.

6. The onboard sensor cover according to claim 4, wherein when a thickness of the cover body is set as T, a wavelength of the millimeter wave is set as λe, an average value of a relative permittivity of the front base and the rear base is set as εp, and an integer is set as n, the thickness T is set to a value that satisfies an equation, $T=\{(\lambda e/2)/\sqrt{(\varepsilon p)}\}n.$ 7. An onboard sensor cover applied to a vehicle, the vehicle including, as an onboard sensor that detects a surrounding situation, an infrared sensor that transmits an infrared ray toward an outside of the vehicle and receives the infrared ray that has struck and has been reflected by an object outside the vehicle and a millimeter wave radar device that transmits a millimeter wave toward the outside of the vehicle and receives the millimeter wave that has struck and has been reflected by the object outside the vehicle, wherein the onboard sensor cover comprises a cover body configured to be arranged in front of the infrared sensor in a transmission direction of the infrared ray and in front of the millimeter wave radar device in a transmission direction of the millimeter wave, the cover body includes a front base made of a transparent plastic material that permits passage of the infrared ray and the millimeter wave, the front base including a rear surface in the transmission directions of the infrared ray and the millimeter wave, the rear surface being configured by a first uneven surface, a rear base made of a plastic material that permits passage of the infrared ray and the millimeter wave and arranged on a rear side of the front base in the transmission directions, the rear base including a front surface in the transmission directions, the front surface being configured by a second uneven surface that corresponds to the first uneven surface of the front base, and a decorative layer made of a material that reflects visible light and permits passage of the infrared ray and the millimeter wave, the decorative layer being in contact with the first uneven surface of the front base and the second uneven surface of the rear base between the front base and the rear base, and the front base and the rear base are each made of any one of plastic materials of polycarbonate plastic (PC), poly methyl methacrylate plastic (PMMA), and acrylonitrile-butadiene-styrene copolymer plastic (ABS).

8. The onboard sensor cover according to claim 7, wherein the decorative layer includes at least one of a cold mirror layer or an infrared ray passage ink layer.

9. The onboard sensor cover according to claim 7, wherein when a thickness of the cover body is set as T, a wavelength of the millimeter wave is set as λe, an average value of a relative permittivity of the front base and the rear base is set as εp, and an integer is set as n, the thickness T is set to a value that satisfies an equation, $T=\{(\lambda e/2)/\sqrt{(\varepsilon p)}\}n.$

* * * * *